Oct. 14, 1941.  J. G. McNALLY  2,258,991
MANUFACTURE OF LAMINATED GLASS
Filed March 2, 1937

James G. McNally
INVENTOR.
BY
ATTORNEYS

Patented Oct. 14, 1941

2,258,991

UNITED STATES PATENT OFFICE 2,258,991

MANUFACTURE OF LAMINATED GLASS

James G. McNally, Rochester, N. Y., assignor to Eastman Kodak Company, Rochester, N. Y., a corporation of New Jersey Application March 2, 1937, Serial No. 128,650

1 Claim. (Cl. 49—92)

This invention relates to the manufacture of laminated glass of the type commonly known as "safety glass" and more particularly to a type of plastic sheet material especially adapted for the manufacture of such glass.

As is well-known, many types of material have been employed for the manufacture of plastic sheets or layers to be employed in the manufacture of safety glass structures. Up until the last few years, cellulose nitrate has been the material most commonly employed, but due to the fact of its inherent tendency toward discoloration due to photo-chemical decomposition, it has been largely superceded by cellulose organic ester material such as cellulose acetate, and other single or mixed organic acid esters of cellulose which are not susceptible to this particular defect and are superior in many respects to cellulose nitrate. It has also been suggested to employ various natural or synthetic resins, particularly resins of the vinyl, phenol-formaldehyde, paratoluene sulphonamid-formaldehyde and other types for this purpose. Such plastic sheets or layers have been formed, either by depositing a flowable dope on a suitable film-forming surface such as a moving wheel or band and evaporating solvents therefrom; or by skiving a partially dried cake of the plastic composition and subsequently curing the skived sheets.

Although the common practice in employing such sheet material in the manufacture of laminated glass is to employ a single sheet of the plastic and cement or otherwise secure this sheet to the sheets of glass, a plurality of plastic sheets may be joined or laminated together by means of solvents or cements and the application of heat and pressure and the laminated structure thus produced be used as a single sheet. In such laminated sheeting it is not possible to separate the component layers by mechanical force because the strength of the bond between the layers is for all practical purposes the same as the mechanical strength of the material from which the layers are produced. In both the single layer and multiple layer sheet plastic material it will be evident that the rigidity characteristics are substantially uniform from one surface of the sheet to the other.

Laminated glass produced as described above in which the plastic layer is either a single sheet of a cellulose ester plastic, such as cellulose nitrate or acetate, for example, or is a composite sheet built up of layers of the same material, does not have as great resistance to shattering under impact as a product made in the manner described hereinafter. In other words, where the interposed plastic layer is substantially homogeneous and possesses the same rigidity characteristics throughout, there is a tendency for a break occurring in one of the glass sheets to be transmitted through the homogeneous layer underneath and thereby defeat the primary object of the use of such layer, namely, to prevent shattering.

This invention has as its principal object to provide an improved plastic sheet material which, when used in a laminated glass structure, has an increased resistance against breaking under impact. A further object is to provide a plastic sheet material suitable for use in the manufacture of safety glass which has distinctive rigidity characteristics and the ability to resist fracture, especially under mechanical bending and twisting strains. A still further object is to provide an improved type of laminated glass which will have less tendency toward shattering under impact than laminated glass now commonly used and having a much higher degree of flexibility and resiliency. Other objects will appear hereinafter.

These objects are accomplished by the following invention which in its broader aspects comprises the placing between two plastic sheets having given rigidity characteristics a sheet of plastic material having a higher degree of elasticity than the outer sheets and laminating this structure together to produce a composite sheet having an inner elastic layer. In other words, the fundamental feature of my invention is that at least one layer is provided in the interior of the composite structure, which layer has greater elasticity and less rigidity than the other component layers in the sheet.

The material used in the elastic layer will depend largely upon the materials from which the outer layers of the composite structure are composed, but it is always so chosen that it has less rigidity and is more easily stretched than the other layers. It will be obvious that a given material might fulfill this condition for one laminated structure and fail to meet it for another structure where the ease of deformation of the outer layers is very much more than in the first case.

In the following examples and description I have set forth several of the preferred embodiments of my invention, but they are included merely for purposes of illustration and not as a limitation thereof.

The laminated plastic sheet of my invention may be formed in a variety of ways and the particular method of formation is not critical. For example, I may select a sheet material having a certain degree of elasticity or rigidity, such as sheets of cellulose acetate and interpose between such sheets a sheet of resilient material, such as a sheet of transparent rubber, a suitable transparent resin such as poly vinyl acetal or butal, a sheet of more highly plasticized cellulose acetate than the other cellulose acetate sheets, etc., and join the composite structure by any convenient method of lamination such as by appropriate solvents, cements, or in the case of using a resinous or other adhesive material for the inner elastic layer, simply by the application of heat and pressure.

The outer or more rigid sheets may be composed of one type of cellulose ester, for example, cellulose acetate, and the inner elastic layer may be composed of a more elastic cellulose ester composition such as one of the single or mixed organic acid esters of cellulose. In another form of my invention the elastic inner layer may be composed of the same cellulose derivative material as the outer layers but rendered more elastic or easily flowable by virtue of the presence therein of a higher percentage of plasticizer than is present in the outer more rigid sheets. In some instances the inner plastic sheet may be plasticized with a different plasticizer than the outer sheets, that is, a plasticizer having a more drastic plasticizing effect upon the inner sheet material than the plasticizers present in the outer sheets.

The composite plastic sheet may contain one or a plurality of elastic inner layers, if desired. Whether one or more layers is employed, the material is distinguished by a greater elasticity and resistance to mechanical strains, especially those resulting from bending or twisting, than is a single sheet of plastic material of uniform composition and characteristics throughout.

My invention will be more fully understood by reference to the following specific examples:

*Example I.*—A sheet of transparent rubber of .005 inch in thickness is interposed between two clear, transparent sheets of cellulose acetate of about .010 inch in thickness, the inner surfaces of which have been treated with a solvent cement composed of cellulose nitrate. The individual layers are laminated into a composite structure under gentle heat and pressure.

The resulting laminated sheet may then be interposed between two sheets of glass and adhesively joined thereto in accordance with standard safety glass practice. A highly satisfactory procedure for the lamination of the plastic sheet is that disclosed in my prior U. S. Patent 2,026,987. The resulting glass structure will withstand far greater impacts without shattering and without penetration of any breaks which may occur in the glass sheets into the plastic layer than is the case when employing plastic layers of homogeneous or substantially homogeneous composition as is common practice in the manufacture of this type of glass.

*Example II.*—A solution of polymerized methyl acrylate dissolved in acetone is deposited on a sheet of cellulose acetate of about .010 inch in thickness and solvents evaporated to produce a resin layer of about .002 inch in thickness on the sheet. A second sheet of cellulose acetate is then placed on the resin-coated sheet and laminated thereto by means of heat and pressure. The plastic sheet thus produced and characterized by the presence of an elastic inner layer of polymerized methyl acrylate is then employed in the manufacture of laminated glass by any of the standard methods, as for example, the method disclosed in my Patent 2,026,987.

*Example III.*—A sheet of benzyl cellulose containing 50% by weight of triphenylphosphate is laminated in known manner between two sheets of cellulose acetate, each of which is composed of 100 parts of cellulose acetate and 50 parts dimethyl phthalate. This composite sheet material is then employed as the interposed plastic layer in the manufacture of laminated glass as in Examples I and II.

*Example IV.*—A sheet .005 in thickness having the following composition:

| | Parts |
|---|---|
| Cellulose acetate propionate (18% propionyl, 75 p. v) | 100 |
| Dimethyl phthalate | 80 | is laminated by heat and pressure between two sheets .010 inch in thickness having the composition

| | Parts |
|---|---|
| Cellulose acetate 73% precipitation value | 100 |
| Dimethyl phthalate | 80 |

The composite laminated sheet is then interposed between two sheets of glass and laminated thereto.

My invention will be more fully understood by reference to the accompanying drawing in which.

It will, of course, be understood that the relative thicknesses of the respective laminae in the structures of Figs. 1 to 5 are greatly exaggerated in the interest of clearness of illustration.

Figure 1:
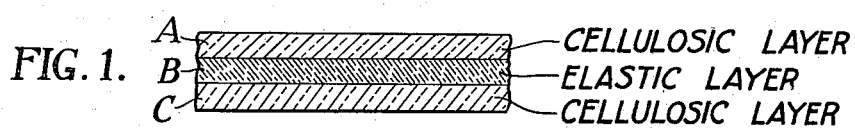
Fig. 1 is a section through a composite plastic sheet produced in accordance with my invention.
Figure 4:
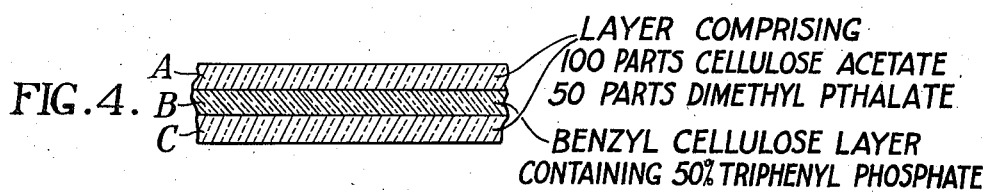
Fig. 4 is a sectional view illustrating a specific embodiment of the invention.

Referring to Figs. 1 and 4, it will be seen that each of these sheets is a plastic sheet having an elastic inner layer B laminated between two outer more rigid layers of plastic material A and C. In the structure of Fig. 4 it will be noted that in this modification a different cellulosic derivative is employed as the elastic inner layer than the two outer layers.

Figure 2:
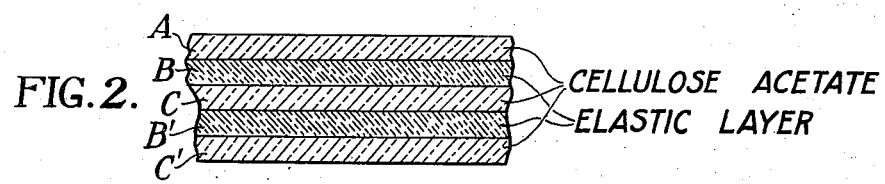
Fig. 2 is a sectional view illustrating a modified form of my composite sheeting in which a plurality of elastic inner layers are employed.

Referring to Fig. 2, in this modification of my invention a plurality of elastic layers B and B' are employed, the inmost layer C of cellulose acetate being interposed between the elastic layers B and B'.

Figure 3:
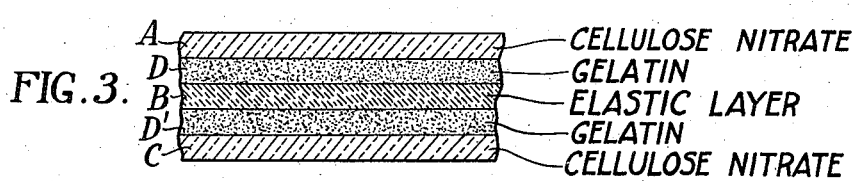
Fig. 3 is a sectional view through another modification in which a single elastic layer is employed together with a plurality of outer layers each of which varies in composition.

The structure of Fig. 3 is substantially similar to that of Figs. 1 and 4, except that layers of gelatin D and D' are interposed between the inner elastic sheet B and the outer plastic sheets A and C.

Figure 5:
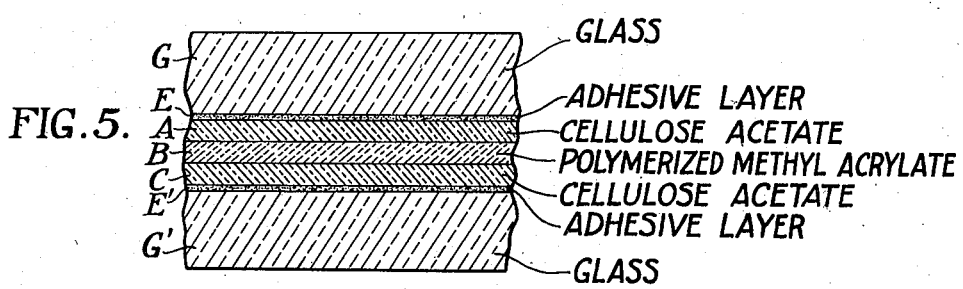
Fig. 5 is a cross-section through a laminated glass structure illustrating the application of the plastic sheets of my invention to the manufacture of safety glass.

Referring to Fig. 5, the composite plastic sheet is composed of the two outer sheets of cellulose acetate A and C and the elastic inner layer of polymerized methyl acrylate B. The composite plastic sheet A—B—C is joined to the glass sheets G and G' by means of the adhesive layers E and E'.

While I have found it convenient to illustrate my invention by reference to certain specific plastic material, the broad scope of my invention includes any plastic material which can be employed in the manufacture of plastic sheeting suitable for the manufacture of laminated glass and similar structures. For example, I may employ a wide variety of cellulose derivatives as the outer plastic sheets in producing my composite material, examples being cellulose nitrate, cellulose acetate, cellulose propionate, cellulose acetate propionate, cellulose acetate butyrate and many other mixed or single esters of cellulose. I may likewise employ various ethers of cellulose such as methyl, ethyl and benzyl cellulose and the like. The elastic inner layer may also be composed of these materials, provided that the particular composition employed has a higher degree of elasticity than the outer sheets or layers. For example, I may employ cellulose acetate sheets exclusively, but in this case the inner sheet will be plasticized or otherwise treated so as to have a higher degree of resiliency than the outer sheets to which it is laminated.

As indicated above, the elastic inner layer may be composed of a wide variety of materials of varying degrees of elasticity or plasticity such as rubber, various resins such as polymerized methyl acrylate and many others.

It will thus be seen that I have produced a plastic material of highly desirable characteristics in the manufacture of safety glass and have also provided an improved type of laminated glass which has a much greater resistance to shattering under impact and resistance to certain types of mechanical strains especially those resulting from bending or twisting. Many advantages flow from the application of my invention which will be apparent to those skilled in the art.

What I claim and desire to secure by Letters Patent of the United States is:

Laminated glass having a high degree of resistance to shattering under impact and under bending and twisting strains comprising sheets of glass bonded together through the medium of a composite, flexible, non-brittle, plastic sheet characterized by a high degree of resistance to shattering under bending and twisting strains, said sheet comprising two outer sheets of cellulose acetate having a relatively low degree of elasticity and plastic deformability laminated to an inner sheet composed of polymerized methyl acrylate of appreciable thickness, said inner sheet material having a higher degree of elasticity than the cellulose acetate sheets.

JAMES G. McNALLY.